United States Patent [19]
Ramalingam et al.

[11] Patent Number: 5,907,707
[45] Date of Patent: May 25, 1999

[54] OBJECT MODEL FOR JAVA

[75] Inventors: Ganesan Ramalingam, Croton-on-Hudson; Harini Srinivasan, Tarrytown, both of N.Y.

[73] Assignee: International Business Machines Corporation, Armonk, N.Y.

[21] Appl. No.: 08/782,995

[22] Filed: Jan. 14, 1997

[51] Int. Cl.⁶ ...................................................... G06F 9/45
[52] U.S. Cl. ...................... 395/701; 395/702; 395/705; 395/708
[58] Field of Search .................................. 395/702, 683, 395/200.33, 604, 700, 708; 707/103; 364/955.3, 955.5

[56] References Cited

U.S. PATENT DOCUMENTS

| | | | |
|---|---|---|---|
| 5,265,206 | 11/1993 | Shackelford et al. | 395/683 |
| 5,361,350 | 11/1994 | Conner et al. | 707/103 |
| 5,367,685 | 11/1994 | Gosling | 395/707 |
| 5,404,525 | 4/1995 | Endicott et al. | 395/702 |
| 5,481,708 | 1/1996 | Kukol | 395/709 |
| 5,493,680 | 2/1996 | Danforth | 395/702 |
| 5,748,964 | 5/1998 | Goslings | 395/705 |

FOREIGN PATENT DOCUMENTS

0777177A1  4/1997  European Pat. Off. .......... G06F 9/44

OTHER PUBLICATIONS

"An Object Addressing Mechanism for Statically Typed Languages with Multiple Inheritance", R.C.H. Connor et al., OOPSLA '89 Proceesings, pp. 279–285.

"A Fast Method Dispatcher for Compiled Languages with Multiple Inheritance", R. Dixon et al., OOPSLA '89 Proceedings, pp. 211–214.

"Message Dispatch on Pipelined Processors", K. Driesen et al., ECOOP '95 Proceedings, pp. 252–282.

"Minimizing Row Displacement Dispatch Tables", K. Kriesen et al., OOPSLA '95 Austin, Texas, pp. 141–155.

"Optimizing Dynamically–Typed Object–Oriented Languages with Polymorphic Inline Caches", U. Holzle et al., ECOOP '91 Proceedings, pp. 20–38.

(List continued on next page.)

*Primary Examiner*—Tariq R. Hafiz
*Assistant Examiner*—Anil Khatri
*Attorney, Agent, or Firm*—Ratner & Prestia

[57] ABSTRACT

The mechanism includes three data structures: object data associated with each object O1, O2, O3 . . . of a program, a class descriptor associated with the classes to which the objects O1, O2, O3 . . . belong, and interface references. For each class $C_i$, the class descriptor corresponding to the class $C_i$ includes: i) a class method table comprising one or more entries, wherein each entry identifies an implementation of a method inherited or defined by the class $C_i$; and ii) for each interface implemented by the class $C_i$, an interface method table comprising one or more entries, wherein each entry identifies an implementation of a method declared by the particular interface or an implementation of a method declared by an interface extended by the particular interface. An interface reference for an interface declaration ID associated with a given object OI, wherein the object OI implements methods that are declared by an interface declaration ID includes a pointer to the interface method table corresponding to the interface declaration ID within the class descriptor corresponding to the object OI. An efficient mechanism for method invocations is provided by generating an index that identifies the entry corresponding to the appropriate method in the interface method table pointed to by the pointer of the interface reference, reading the data stored by the entry identified by the index, and controlling the computer processing apparatus to jump to the address identified by the data.

11 Claims, 9 Drawing Sheets

OTHER PUBLICATIONS

"Bidirectional Object Layout for Separate Compilation", A. Myers et al., OOPSLA '95 Austin Tx., pp. 124–139.

"Two–directional record layout for multiple inheritance", W. Pugh et al., Proc. of the ACM SIGPLAN '90 Conference, Jun. 1990, pp. 85–91.

"Fast Dispatch Mechanism for Stock Hardware", J. Rose et al., OOPSLA '88 Conf. Proc., pp. 27–35.

Jason Steinhorn, Compiling Java, Embedded system programming, vol. 11, No. 10, pp. 42–56, Sep. 1998.

Singhal & Nguyen, "The Java Factor", Comm. of the ACM, vol. 41, No. 6, pp. 35–37, Jun. 1998.

Class-Interface Cast Table
For Class E

| Interface | Offset |
|---|---|
| I | 0 |
| J | x |
| K | y |

Fig. 8A

Interface - Interface Cast Table
for Interface K of Class E

| Interface | Offset |
|---|---|
| I | 0 |
| J | x |

Fig. 8B

OBJECT MODEL FOR JAVA

BACKGROUND OF THE INVENTION

1. Field of the Invention

The present invention generally relates to object oriented programming (OOP) systems and, more particularly, to OOP systems supporting the Java™ programming language.

2. Background Description

In current implementations of Java™, method invocations may involve a search through a method table to identify the (address of the) function to be invoked. A cache may be used to eliminate the search under certain circumstances. In contrast, a method invocation (typically referred to as a virtual function call) in C++ usually requires only a constant overhead: the address of the function to be invoked is obtained by simply indexing into a virtual function table, where the index value itself is a compile time constant. Thus, method invocations in current implementations of Java™ can be considerably more expensive than method invocations in C++. The present invention is directed at improving the performance of method invocation in OOP systems such as Java™.

In order to better understand the invention, some background material is presented regarding inheritance in the Java™ programming language, casts and method invocations in the Java™ programming language, and the implications of inheritance and method invocations on the object model utilized by current implementations of the Java™ programming language.

Inheritance in Java™

Before understanding the Java™ inheritance mechanism, one must first understand the concepts of class and interface in Java™. Java™ classes are more or less like classes in other languages, eg. C++, consisting of data members (variables) and member functions (methods). Inheritance is a mechanism that allows descendants of a class to inherit all (or portions) of the variables and methods from the ancestors of the class. Java™ allows only single inheritance among classes. The following pseudo-code illustrates the concept of single inheritance among classes:

```
class C1 {
    public void f1();
    int c1data;
}
class C2 extends C1 {
    public void f2();
    int c2data;
}
class C3 extends C2 {
    public void f1();
    public void f3();
    int c3data;
}
```

Class C2 inherits from class C1. An object of type C2 will contain, in addition to its data 'c2data', the data members corresponding to those declared in C1 as well, i.e. 'c1data'. C2 also inherits any methods implemented by C1 that it does not implement, i.e., f1( ). Likewise, C3 extends C2 and hence contains, in addition to 'c3data', both 'c1data' and 'c2data'. C3 also inherits implementation of method f2( ), and has its own implementation of method f1( ). A more detailed description of Java™ classes and the single inheritance mechanism associated with Java™ classes may be found in "Java Language Specification", by James Gosling, Bill Joy and Guy Steele.

In addition the Java™ programming language provides for interfaces which specify the set of methods that must be implemented by any class that implements that interface (but does not provide any implementation of these methods itself). More specifically, the Java™ programming language provides for declarations wherein a user declares variables of type I, where I is an interface. Such variables can store a reference to an object of any class that implements the interface I. Such variables are referred to below as interface references. Interface references can be used to invoke any of the methods declared in the interface declaration. Importantly, the Java™ programming language provides for multiple inheritance among interfaces, i.e., an interface may extend multiple interfaces. Further, a class can implement multiple interfaces. For example, consider the following pseudo-code:

```
interface I {
    public void foo();
}
class C implements I {
    public void foo() { ... }
    int d;
}
interface J {
    public void zap();
}
class D implements I implements J {
    public void zap() { ... }
    public void foo() { ... }
}
interface K extends I, J {
    public void zip();
}
class E extends C implements K {
    public void zip() { ... }
    public void zap() { ... }
}
class Example {
    public void main() {
        s1: I pi;
        s2: pi = new C;
        s3: pi.foo();
    }
}
```

In this example, interface I introduces a method foo( ). Class C implements I and provides an implementation for foo( ). Class D defines both methods foo( ) and zap( ) introduced in interfaces I and J respectively. In this case, D implements multiple interfaces. The declaration of interface K illustrates multiple inheritance among interfaces since K extends both I and J. I, J, K introduce methods foo( ), zap( ) and zip( ) respectively. Class E implements K and extends class C, and therefore, either defines or inherits implementations of foo( ), zap( ) and zip( )—it defines zap( ) and zip( ) and inherits C's implementation of foo( ).

A more detailed description of interfaces and the multiple inheritance mechanism associated with interfaces may be found in "Java Language Specification", by James Gosling, Bill Joy and Guy Steele.

Method Invocations and Casts in Java™

The use of interface references is illustrated in the pseudo-code above. In function main( ), statement s1 declares pi to be an interface reference to interface I. Statement s2 creates an object of type C and assigns to pi a reference to this object. Statement s3 invokes foo( ), the method declared in I and defined in C, via the interface reference pi that is pointing to the C object. The interface reference pi is used at run time to determine the exact implementation of foo( ).

Casts in Java™ fall into two categories: static casts, whose validity can be established at compile time, and dynamic casts whose validity needs to be checked at run time. A cast from a type S to a type T is static if S is a subtype of T, and dynamic otherwise. More specifically, a cast from a derived class to a base class is a static cast and requires no run time test to determine the validity of the cast. However, a cast from a class B to another class D, where class B does not derive from class D, is a dynamic cast and requires a run time test to determine the validity of the cast.

Consider the following code, where D is a derived class of B:

s1: B bp;
s2: if (P) bp=new B; else bp=new D;
s3: D dp;
s4: dp=(D) bp;

At s1, bp is declared to be a class reference of type B. The 'if' statement in s2 assigns a value to bp: if the if-condition, P, is 'true', bp is assigned a reference to a B object, created by the 'new B' statement; if P is 'false', bp is assigned a reference to a D object, created by the 'new D' statement. Therefore, depending on the run-time value of P, bp either points to a B object or a D object at run-time. At s3, dp is declared to be a class D reference. The cast in line s4 assigns a reference to a B object to a reference to a D object. Since B does not derive from D, this cast requires a run time check to make sure that bp points to a D object rather than a B object. The compiler would generate code at s4 for such a run-time check.

To implement this run time check, it is necessary to have some run time type information associated with objects. This type information need not be stored in the object itself. It is usually stored in the class descriptor. A more detailed description of information stored for a given object is now described with respect to the Java™ object model.

Implications of Inheritance and Casts on the Java™ Object Model

An object model answers the following questions: How are objects laid out in memory, how are references (including interface references) laid out in memory, what data structures are necessary to implement object oriented language features such as inheritance, dynamic dispatch, dynamic casts, etc., how these data structures are laid out in memory, and finally what code sequences are required to implement object oriented language features.

In current Java implementations, a class descriptor is associated with every class. The class descriptor contains run-time type information, for doing type checks at run-time and a method table for the class. The method table is essentially a table of entries for methods implemented by the class. In some Java implementations, the method table in a class's descriptor also contains entries for methods inherited by the class. Each entry in a method table contains the address of a method and an identifier that identifies the method uniquely. The offset of a method's entry in method tables for different classes may be different. When a method is invoked, via a class reference or interface reference, a search of the method table using the identifier for the method may be required to determine the address of the method implementation.

In some Java implementations, this search is optimized for under certain circumstances—when a sequence of instructions containing a method invocation is executed multiple times, the offset of the method being invoked in the method table can be cached and this cached value can be used to reduce the overhead of the search ("The Java Virtual Machine Specification", by Tim Lindholm and Frank Yellin; "Method and Apparatus for Resolving Data References in Generated Code", U.S. Pat. No. 5,367,685 in the name of James Gosling.). However, the search during method invocation can not always be completely eliminated whenever an interface is implemented by multiple classes. Invocations of methods declared in such interfaces will be frequent in Java programs that separate interface from implementations, such as client-server distributed applications. It is therefore important to improve the performance of Java method invocations.

SUMMARY OF THE INVENTION

The above-stated problems and related problems of the prior art are solved with the principles of the present invention, Object Model for Java™. The mechanism of the present invention includes three data structures: object data associated with each object O1, O2, O3 . . . of a program, a class descriptor associated with the classes to which the objects O1, O2, O3 . . . belong, and interface references.

The object data associated with a given object $O_i$, which belongs to a class $C_i$ of objects, includes:

i) a pointer to a class method table in the class descriptor corresponding to the class $C_i$ (a more detailed description of the class descriptor is set forth below); and ii) data, such as variables, associated with the object $O_i$.

For each class $C_i$, the class descriptor corresponding to the class $C_i$ includes:

i) a class method table comprising one or more entries, wherein each entry identifies an implementation of a method inherited or defined by the class $C_i$; and ii) for each interface implemented by the class $C_i$, an interface method table comprising one or more entries, wherein each entry identifies an implementation of a method declared by the particular interface or an implementation of a method declared by an interface extended by the particular interface.

Finally, an interface reference for an interface declaration ID associated with a given object OI, wherein the object OI implements methods that are declared by an interface declaration ID, includes:

i) a first pointer to the interface method table corresponding to the interface declaration ID within the class descriptor corresponding to the object OI; and ii) a second pointer that identifies the object OI.

An efficient mechanism for method invocations is provided by generating an index that identifies the entry corresponding to the appropriate method in the interface method table pointed to by the first pointer of the interface reference, reading the data stored by the entry identified by the index, and controlling the computer processing apparatus to jump to the address identified by the data.

BRIEF DESCRIPTION OF THE DRAWINGS

The foregoing and other objects, aspects and advantages will be better understood from the following detailed description of a preferred embodiment of the invention with reference to the drawings, in which:

FIGS. 8(A) and (B) are pictorial representations of a class-interface cast table and interface-interface cast table of the present invention.

DETAILED DESCRIPTION OF PREFERRED EMBODIMENTS OF THE INVENTION

Figure 1A:
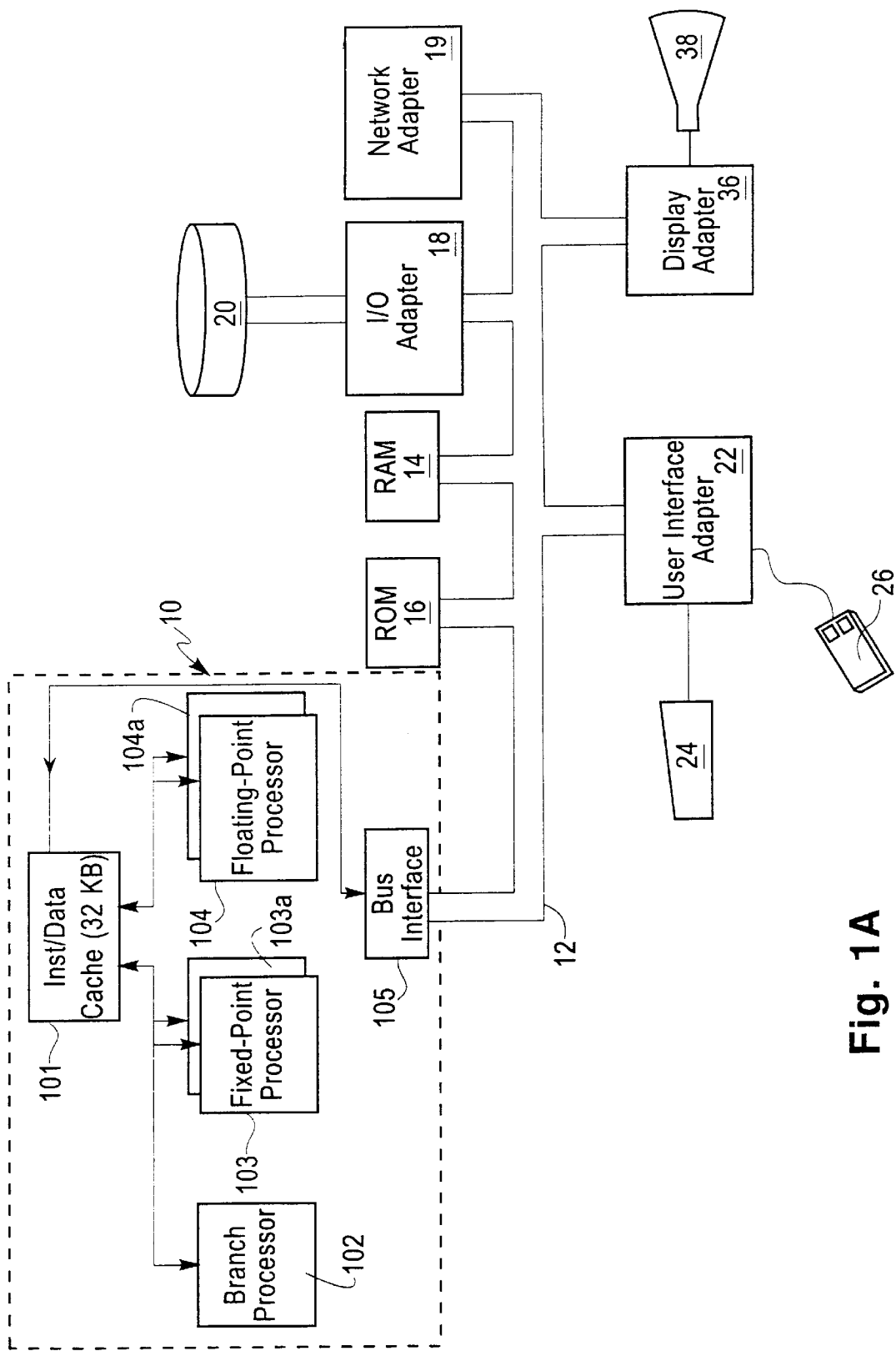
FIG. 1(A) is a block diagram showing a hardware configuration on which the subject invention may be implemented.

Referring now to the drawings, and more particularly to FIG. 1A, there is shown a representative computer processing apparatus on which the subject invention may be implemented. The computer processing apparatus includes a central processing unit (CPU) 10 and an instruction cache and data cache, which may be combined into a single cache 101 as shown. The instruction cache stores instructions to be executed by the CPU 10. The data cache stores data to be used in the execution of such instructions. The CPU 10 includes a plurality of execution units. The execution units may include a branch processor 102, one or more integer units (FXU) 103, and one or more floating point units (FPU) 104 as shown. The branch processor 102 executes branch instructions issued from the instruction cache. The FXU 103 executes integer based instructions issued from the instruction cache. And the FPU 104 executes floating point instructions issued from the instruction cache. The computer processing apparatus may also include additional execution units (not shown), for example a multimedia execution unit, for executing varying sets of instructions issued from the instruction cache. The instructions and data caches communicate with the bus interface 105.

The CPU 10 is attached to a system bus 12 to which are attached a random access memory (RAM) 14, a read only memory (ROM) 16, an input/output (I/O) adapter 18, and a user interface adapter 22. Typically, the user interface adapter 22 has attached to it a keyboard 24, a mouse 26, and/or other user interface devices such as a touch screen device (not shown). Such touch screen device would optionally be installed on the display 38, here represented as a cathode ray tube (CRT) display but which may be a liquid crystal display (LCD) or other suitable display device. The display 38 is connected to the system bus 12 via a display adapter 36.

The computer system's operating system (and other utilities), application program code and data are stored in persistent memory and temporarily loaded into RAM 14 for execution by the CPU 10. The persistent memory is typically provided by a disk drive 20 coupled to the CPU via an I/O adapter 18. In addition, persistent memory may be provided by resources coupled to the CPU 10 via the system bus and a network adapter 19. In this case, portions of the computer system's operating system (or other utilities), portions of the application program code and data may be retrieved from network resources and loaded into RAM 14 for execution by the CPU 10.

Figure 1B:
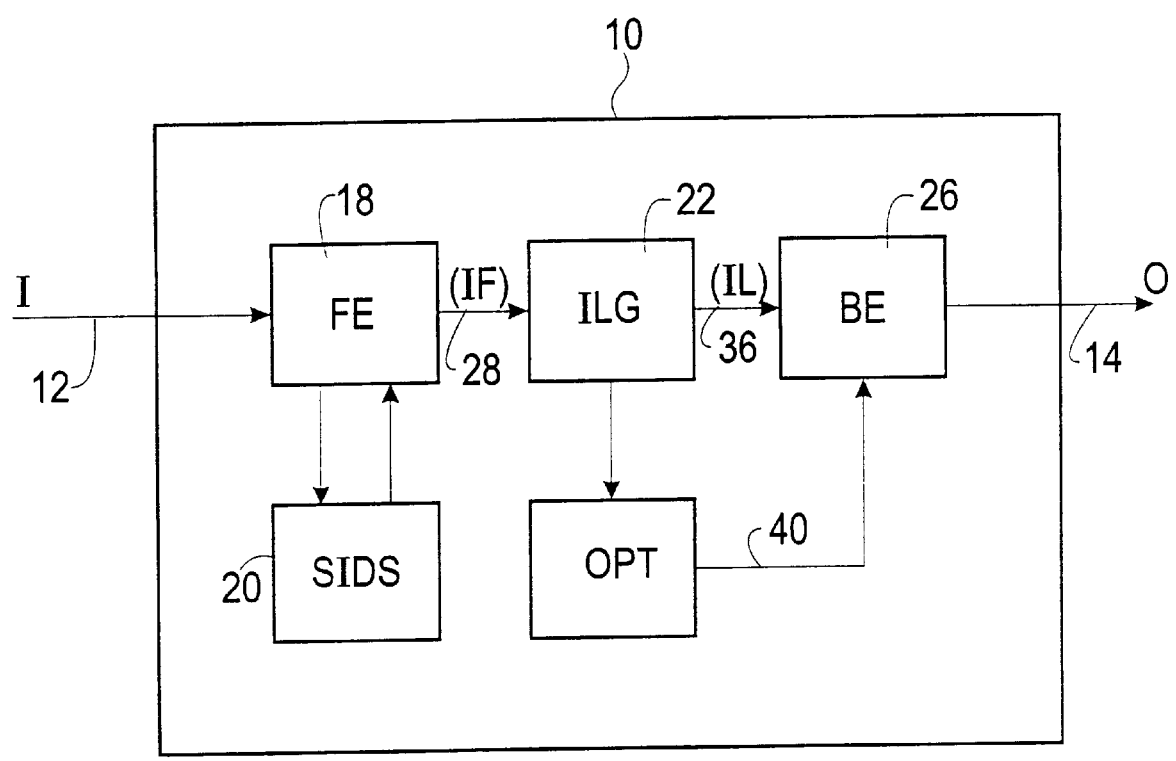
FIG. 1(B) is a block diagram of a compiler apparatus of the present invention.

It should be noted that the methods of the present invention may be utilized in the generation and execution of a compiled program. A compiled program is generated by a compiler that compiles a source program thereby generating executable code for a specific computer architecture. As shown in FIG. 1(B), a compiler 10 accepts as an input (I) 12 a high-level language program, and operates on it to an end of generating an output (O) 14 comprising an output target language program. The output target language program is typically executable on a specific computer architecture. The compiler 10 typically includes a front end (FE) 18, a symbol information data structure(s) 20 for recording information about symbols in an input program, an intermediate language generator (ILG) 22, an optimizer (OPT) 24, and a back end (BE) 26.

The front end 18 typically converts the input program 12 to a (possibly) different internal form (IF) that may be conveyed to the intermediate language generator 22. As part of the preparation of the internal form, the front end 18 typically parses and performs semantic analysis on the source code. The front end may save information in, and possibly retrieve information from, the symbol information data structure(s) 20. These symbol information data structures, if they are used, may either be separate from or adjoined to the intermediate form.

The intermediate language generator 22 produces intermediate language instructions (IL) from the internal form of the program, possibly consulting the symbol table 20. The intermediate language form of the program may be conveyed to the back end 26 either directly or by way of the optimizer 24. If the intermediate language (IL) form of the program is conveyed to the optimizer 24, then the optimizer produces a functionally equivalent and preferably faster or smaller version of the program, typically again in the intermediate form. This version of the program may then be conveyed to the back end 26. To this end, the optimizer 24 may be in communication with the symbol table 20. Once an intermediate language form of the program is received by the back end 26, either directly or after optimization, the back end 26 generates executable code for a specific computer architecture that is functionally equivalent to the intermediate language form of the program. In addition, for object oriented programming languages, the back end 26 implements an object model and generates code that implements the object oriented features used by the source program. In addition, the back end 26 may optimize the generated code. The constitutions and functions of these elements are well known and will not be otherwise described here. For example, further description on the various intermediate language generators and other functionality of the compiler may be found in A. V. Aho et al., "Compilers Principles, Techniques and Tools, Addison-Wesley, 1986.

Figure 1C:
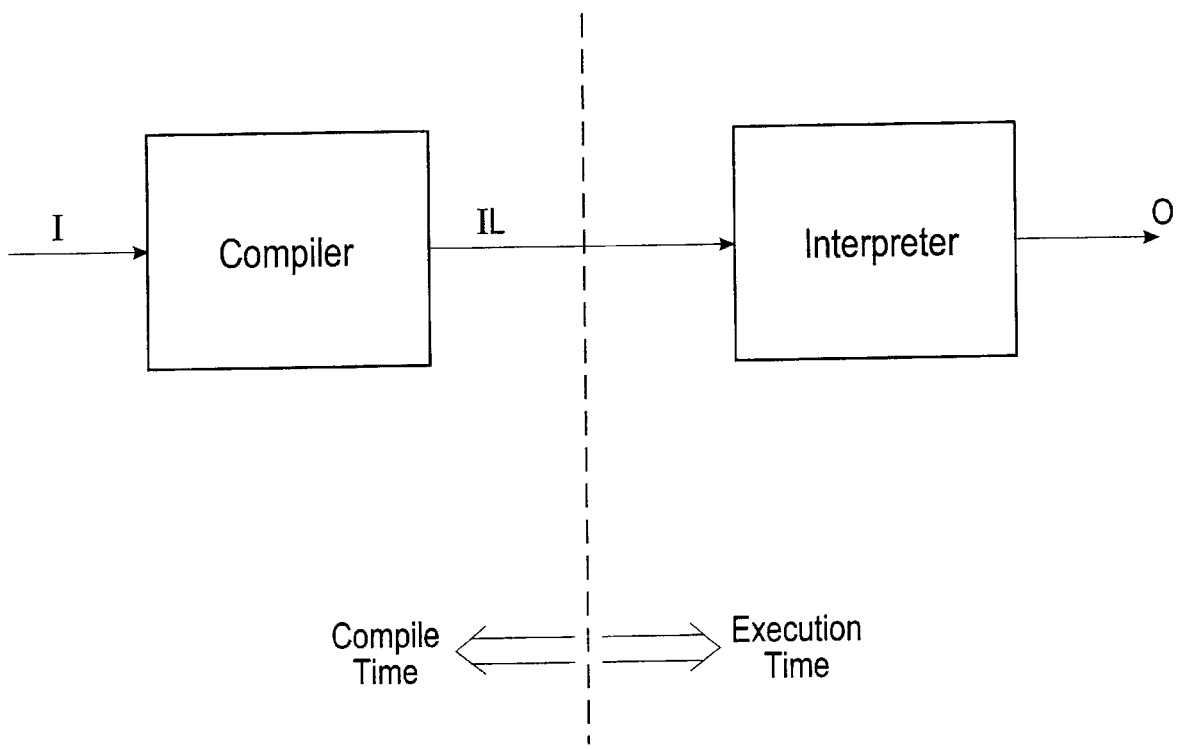
FIG. 1(C) is a block diagram of a hybrid compiler-interpreter apparatus of the present invention.

It should also be noted that the methods of the present invention may be utilized in the generation and execution of a compiled-interpreted program. A compiled-interpreted program is generated and executed by a hybrid compiler-interpreter as shown in FIG. 1(C). The compilation step is performed at compile time and the interpretation step is performed at execution time. In this case, the compiler compiles the source program thereby generating code in intermediate form (IL). At execution time, the interpreter may execute the intermediate code (IL) or translate the IL into a sequence of instructions for execution on a specific computer architecture. The compiler operates similarly to the compiler described above for compiled programs; however, the back end processing is omitted. The interpreter may include a main interpretation routine and a number of operation specific routines. The main interpretation routine receives the intermediate code generated by the compiler as an input, interprets the code, and invokes the appropriate operation specific routine based upon the interpretation.

Preferably, one of the operation specific routines of the interpreter handles method invocations. The constitutions of these elements and functions are well known and will not otherwise be described here. For example, Java™ programs are typically generated and executed as a compiled-interpreted program.

Figure 9:
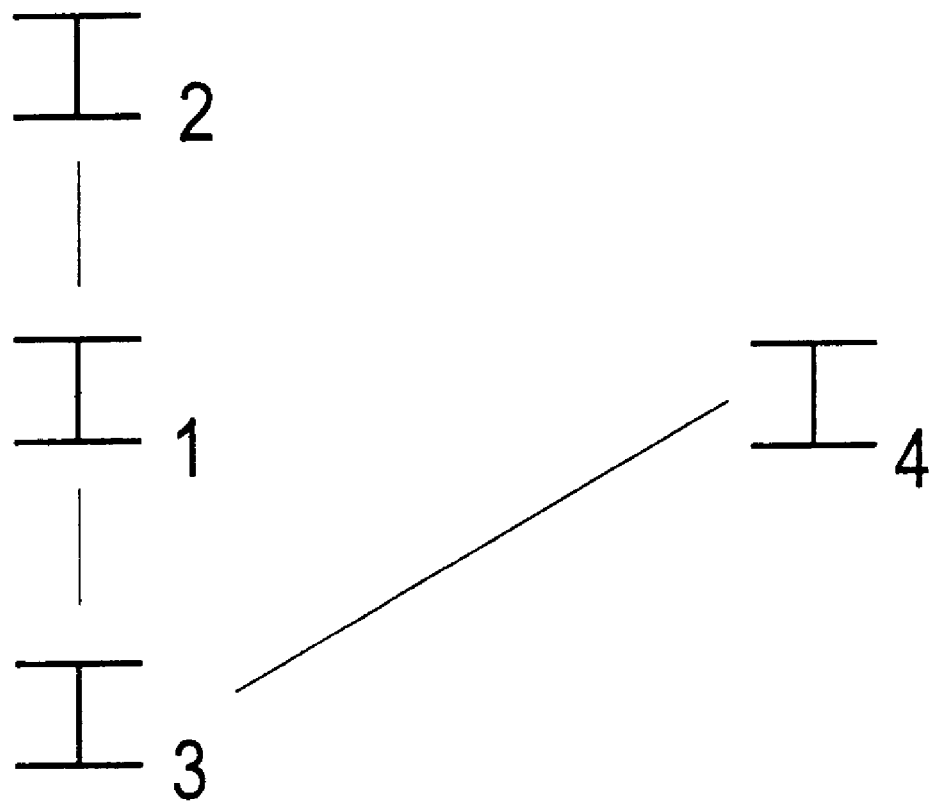
FIG. 9 is a pictorial illustration of a class hierarchy.

As previously described, an interface declaration specifies the set of methods that must be implemented by any class of objects that implements a given interface (but does not provide any implementation of these methods itself). For example, consider the class hierarchy illustrated in FIG. 9. A first interface declaration I1 extends a second interface declaration I2 and thus inherits directly from the interface declaration I2. A third interface declaration I3 extends the first interface declaration I1 and extends a fourth interface declaration I4, and thus inherits directly from interface declarations I1 and I4. Such inheritance is typically referred to as multiple inheritance of interfaces. The Java™ programming language is an example of a language that supports multiple inheritance of interfaces. In this example, the interface declaration I3 indirectly extends the interface declaration I2. The term "extends" or "extension" as used below with respect to inheritance of interfaces refers both to direct and indirect extensions of interfaces.

According to the present invention, a mechanism is provided for efficient dynamic method invocations in object oriented programming languages (such as the Java™ programming language) that support multiple inheritance among interfaces and/or classes that implement multiple interfaces. The mechanism of the present invention includes three data structures: object data associated with each object O1, O2, O3 . . . of a program, a class descriptor associated with the classes to which the objects O1, O2, O3 . . . belong, and interface references.

More specifically, the object data associated with a given object $O_i$, which belongs to a class $C_i$ of objects, includes:
  i) a pointer to a class method table in the class descriptor corresponding to the class $C_i$ (a more detailed description of the class descriptor is set forth below); and
  ii) data, such as variables, associated with the object $O_i$.
For a compiled program, the code for constructing the object $O_i$ is generated by the back end 26 (or other element) when processing a "new" statement and other similar statements. The object $O_i$ is constructed during the execution of such code. For a compiled-interpreted program, the IL code for constructing the object $O_i$ is generated by the compiler when processing a "new" statement and other similar statements. The object $O_i$ is constructed during the execution of such code. The object data for each object $O_i$ is preferably stored in RAM 14 when the program is executing.

For each class $C_i$, the class descriptor corresponding to the class $C_i$ includes:
  i) a class method table comprising one or more entries, wherein each entry identifies an implementation of a method inherited or defined by the class $C_i$; and
  ii) for each interface implemented by the objects of the class $C_i$, an interface method table comprising one or more entries, wherein each entry identifies an implementation of a method declared by the particular interface or an implementation of a method declared by an interface extended by the particular interface.
The class and interface method tables may share entries and thus reduce the space required for the class descriptor. The class descriptor typically includes additional data associated with the class. Such additional data is not directly relevant to the present invention. An example of such additional data may be found in "The Java Virtual Machine Specification", by Tim Lindholm and Frank Yellin, Addison Wesley, September, 1996. The class descriptor corresponding to the class $C_i$ preferably is generated when the class $C_i$ is declared. For a compiled program, the class descriptor is preferably generated by the back end 26 when processing a class declaration and stored in persistent memory for subsequent use at execution time. For a compiled-interpreted program, the class descriptor is preferably generated by the compiler and stored in persistent memory for subsequent use by the interpreter at execution time.

Finally, an interface reference for an interface declaration ID associated with a given object OI, wherein the object OI implements methods that are declared by an interface declaration ID, includes:
  i) a first pointer to the interface method table corresponding to the interface declaration ID within the class descriptor corresponding to the object OI; and
  ii) a second pointer that identifies the object OI.
For both compiled programs and compiled-interpreted programs, code for generating the interface reference is preferably generated by the compiler when processing a cast to an interface reference type. Such code is stored in persistent memory for subsequent use at execution time. For static casts, the code executed at execution time does not require any run time checks. However, for dynamic casts, the code executed at execution time does require one or more run time checks.

Figure 2:
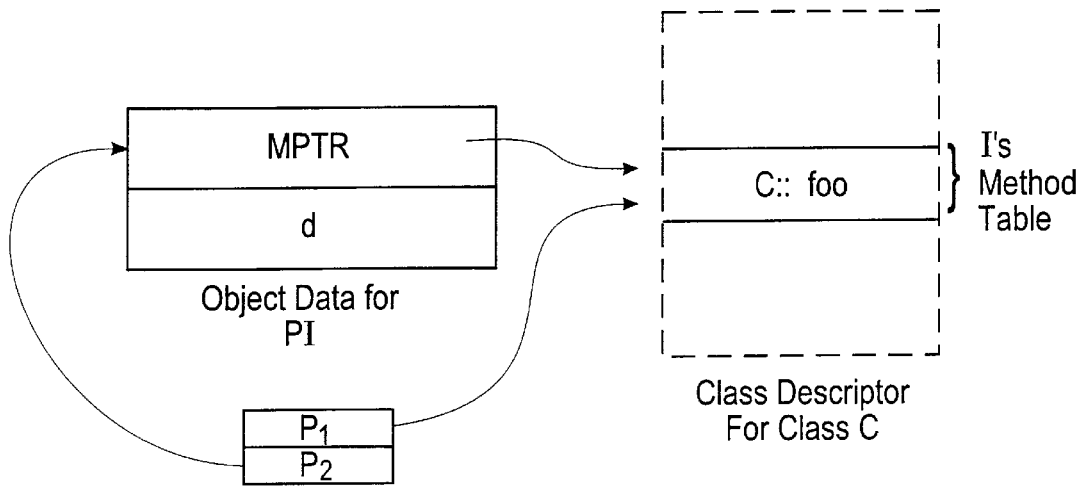
FIGS. 2–4 are pictorial illustrations of the data structures of the present invention.

For example, consider the following statements described in pseudo-code presented above:
  s1: I pi;
  s2: pi=new C;
Statement s1 declares pi to be an interface reference to an interface I, and statement s2 creates an object OC of type C and assigns to pi a reference to the OC object. As shown in FIG. 2, the object OC includes a pointer mptr to the class method table in the class descriptor for the class C, and the variable d associated with the object OC. Class C implements the method foo( ) declared in the interface I. In this case, the class method table for class C preferably includes a single entry for the method foo( ). In addition, the interface method table corresponding to interface I also consists of a single entry for the method foo( ), and thus may share the entry with the class method table as shown in FIG. 2. Finally, the interface reference pi includes pointers p1 and p2, where p1 points to the interface method table corresponding to the interface I in the C class descriptor, and p2 points to the OC object as shown.

Figure 3:
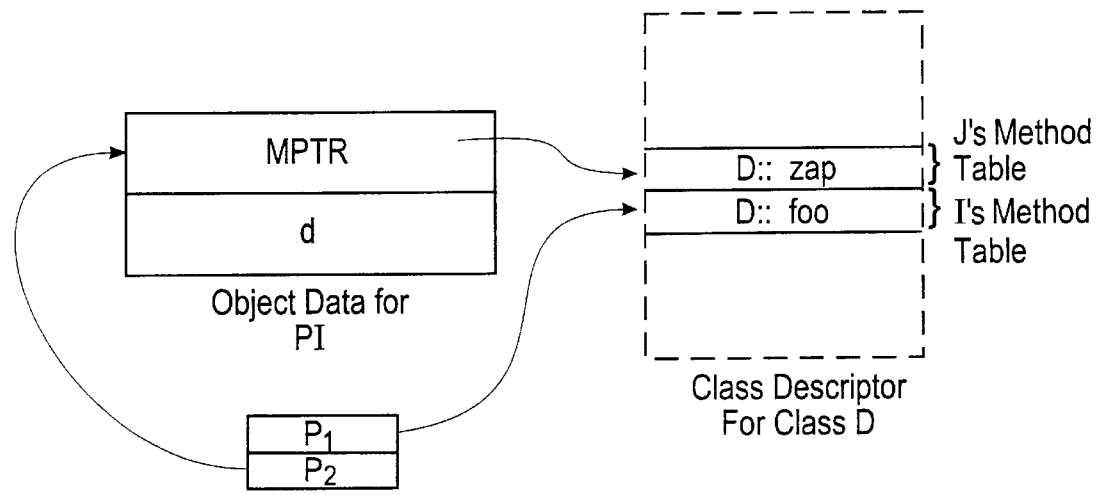

In another example, consider the class D set forth in following statements with reference to the pseudo-code presented above:
  s1: I pi;
  s2: pi=new D;
In this case, statement s1 declares pi to be an interface reference to an interface I, and statement s2 creates an object OD of type D and assigns to pi a reference to the OD object. As shown in FIG. 3, the object OD includes a pointer mptr to the class method table in the class descriptor for the class D, and the variables (none shown) associated with the object OD. The Class D implements the methods foo( ) and zap( ), which are declared in interfaces I and J, respectively. As shown, the class method table for class D includes an entry for method foo( ), which is shared by the interface method table corresponding to interface I. In addition, the class method table for class D includes an entry for the method zap( ), which is shared by the interface method table corresponding to interface J. Finally, the interface reference for the object OD includes pointers p1 and p2, where p1 points to the interface method table corresponding to the interface I and p2 points to the OD object data as shown.

Figure 4:
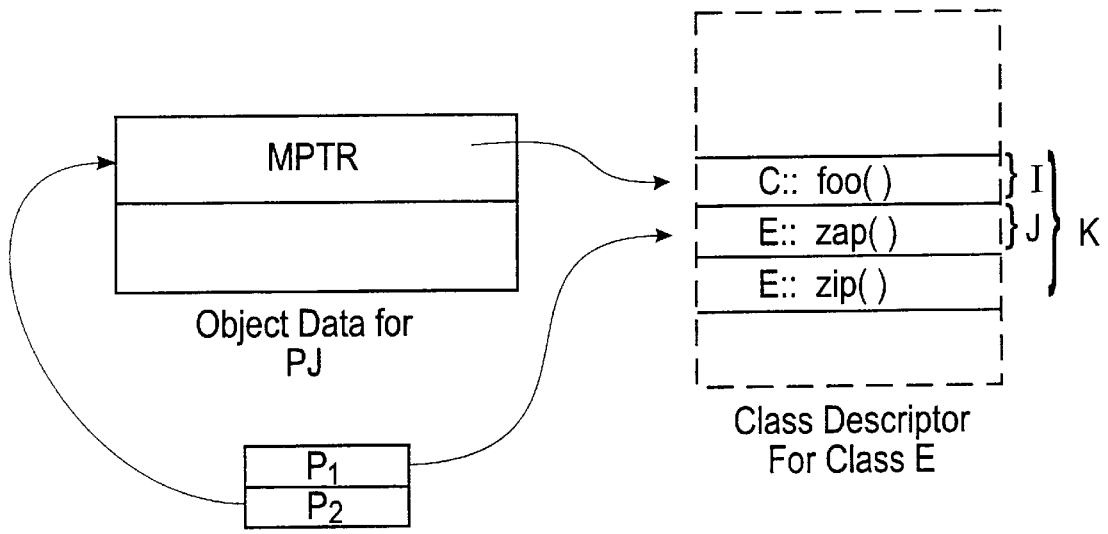

In another example, consider the class E set forth in following statements with reference to the pseudo-code presented above:

s1: J pj;
s2: pj=new E;

In this case, statement s1 declares pj to be an interface reference to an interface J, and statement s2 creates an object OE of type E and assigns to pj a pointer to object OE. As shown in FIG. 4, the object OE includes a pointer mptr to the class method table in the class descriptor for the class E, and the variables (none shown) associated with the object OE. The Class E inherits class C's implementation of foo( ) and implements zip( ) and zap( ). The method foo( ) is declared in interface I, the method zap( ) is declared in interface J, and the method zip( ) is declared in interface K. In this case, the class method table for the class E includes an entry for the method foo( ) corresponding to the interface I, an entry for the method zap( ) corresponding to the interface J, and an entry for the method zip( ) corresponding to the interface K. In addition, the interface method table corresponding to the interface I includes an entry for the method foo( ); the interface method table corresponding to the interface J includes an entry for the method zap( ); and the interface method table corresponding to the interface K includes an entry for the methods foo( ), zap( ) and zip( ). Such entries of the interface method tables in the class descriptor for the class E may be shared with the entries of the class method table as shown in FIG. 4. Finally, the interface reference pj for the object OE includes pointers p1 and p2, where p1 points to the interface method table corresponding to the J interface, and where p2 points to the OE object as shown.

Figure 5:
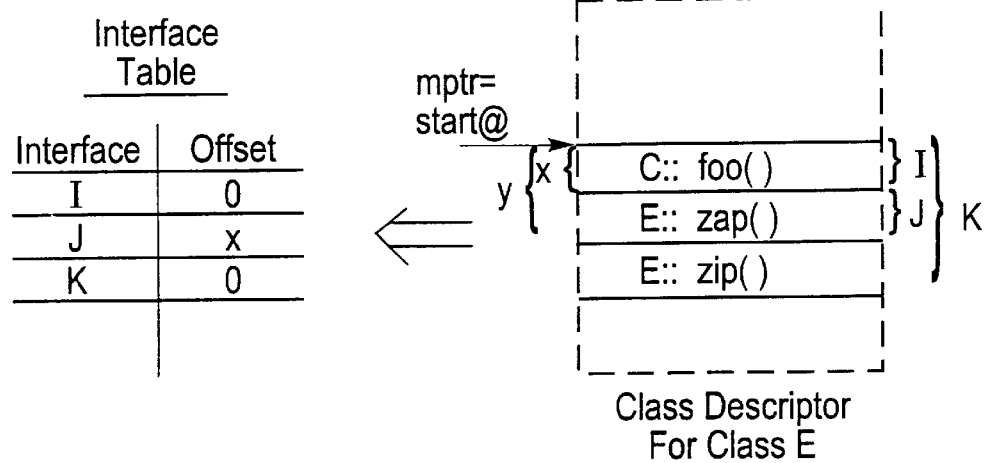
FIG. 5 is a pictorial representation of an interface table of the present invention.

In addition, the present invention preferably utilizes interface cast tables to implement casts. More specifically, a class-interface cast table is provided for each class of objects. Preferably, the class-interface cast table is part of the class descriptor for a given class. The class-interface cast table stores entries associated with the interfaces implemented by a given class, wherein each entry identifies the offset from the start address of the class method table to the interface method table corresponding to the given interface. For example, consider the class E as shown in FIG. 5. In this scenario, the class-interface cast table stores an entry for the interface I indicating a zero offset, an entry for the interface J indicating a offset of X, and an entry for interface K indicating a zero offset as shown in FIG. 8(A). The class-interface cast table is preferably generated by the compiler and used by the compiler in generating code for casts. The class-interface cast table is also used at execution time to implement dynamic casts. A more detailed description of static and dynamic casts is set forth below.

In addition, for each class of objects, an interface-interface cast table is provided for each interface implemented by that class. Preferably, the interface-interface cast table is part of the class descriptor for a given class. The location of the interface-interface cast table is preferably stored in the corresponding interface method table. The interface-interface cast table corresponding to a given interface stores entries associated with the interfaces extended by a given interface. Each entry identifies the offset from the start address of the interface method table corresponding to the given interface to the interface method table corresponding to the interface that extends the given interface. Consider the example presented above with respect to FIG. 5 where Interface K extends interfaces I and J, respectively. In this case, the interface-interface cast table for interface I and the interface-interface cast table for interface J are empty because the interfaces I and J do not extend any interfaces. However, the interface-interface cast table for the interface K stores an entry for the interface I indicating a zero offset, and an entry for the interface J indicating an offset of X as shown in FIG. 8(B).

Figure 6:
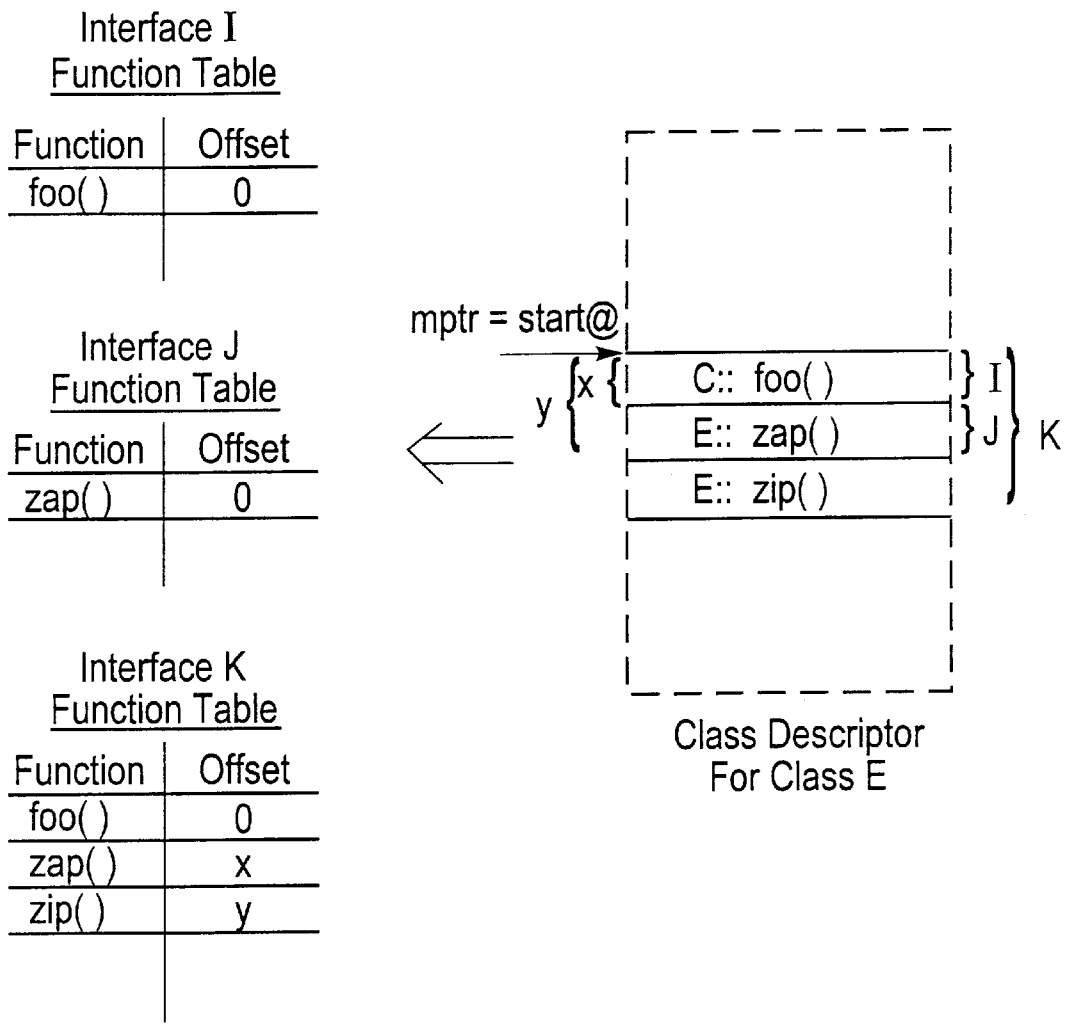
FIG. 6 is a pictorial representation of an interface function table of the present invention.

In addition, the present invention preferably utilizes function tables to provide a mechanism for referencing the entries of the method table of a given class. A function table is provided for each interface implemented by a class. For a particular interface, the function table stores entries associated with the method(s) of the particular interface, wherein each entry identifies the offset of the entry corresponding to the given method within the interface method table corresponding to the particular interface. For example, consider the class E shown in FIG. 6. In this scenario, a function table associated with the interface I stores an entry for the method foo( ) indicating a zero offset. A function table associated with the interface J stores an entry for the method zap( ) indicating a zero offset value. And, a function table associated with the interface K stores an entry for the method foo( ) indicating a zero offset, an entry for the method zap( ) indicating a offset of X, and an entry for the method zip( ) indicating a offset Y. The function table is preferably generated and used by the compiler in generating code for method invocations. A more detailed description of method invocations in set forth below.

Generation of Interface References

As described above, the interface reference of the present invention is associated with an interface that declares one or more methods and an object that implements the methods of the interface, and includes the following two pointers:

i) a first pointer to the interface method table corresponding to the associated interface; and ii) a second pointer that identifies the object.

An interface reference is generated whenever one of the following four types of casts occur:

Type 1: static cast—from a class reference to an interface implemented by that class;

Type 2: static cast—from a derived interface to a base interface;

Type 3: dynamic cast—from a class reference to an interface reference not implemented by that class; and Type 4: dynamic cast—from a first interface reference to a second interface reference which is extended by the first interface reference.

First, consider a type 1 cast as illustrated in the following segment of code, where Class C implements interface I:

```
s0: C pc;
s1: pc = new C;
s2: I pi;
. . .
s3: pi = pc;
. . .
```

Statement s0 declares pc to be a reference to class C. Statement s1 creates an object OC of type C and assigns to pc a reference to this object. Statement s2 declares pi to be an interface reference to an interface I. Statement s3 is an implicit cast of a class reference into an interface reference. This assignment is preferably implemented as follows. As shown in FIG. 2, the class descriptor for the class C includes an interface method table corresponding to interface I, and the OC object includes a pointer mptr to class method table for the class C. In addition, an interface table stores the offset from start of the class method table to the interface method table corresponding to the interface I, which is similar to the interface method table shown in FIG. 5. In this scenario, the second pointer of the interface reference is assigned a value that points to the OC object and the first pointer of the interface reference is assigned a value that points to the interface method table corresponding to the interface I. The value of the first pointer is preferably constructed by adding the appropriate offset as stored in the interface table to the mptr value stored in the OC object. The compiler preferably retrieves the appropriate offset from the interface table at compile time and generates code for performing the addition operation at execution time. Such code is stored in persistent memory for subsequent use at execution time.

Next, consider a type 2 cast from a derived interface I2 to a base interface I1 as illustrated in the following piece of code:

```
s1: I1 pi1;
s2: I2 pi2;
...
s3: pi1 = pi2;
...
```

Statement s1 declares pi1 to be an interface reference to an interface I1. Statement s2 declares pi2 to be an interface reference to an interface I2. Statement s3 casts the I2 reference to an I1 reference and assigns it to pi1. As described above, the pi2 reference has two pointers p1 and p2. The first pointer p1 points to the interface method table corresponding to I2 within the class descriptor for a class C that implements I2. The second pointer p2 points to an object of class C. When processing the statement s3, the compiler preferably generates code for assigning two pointers p1' and p2' to the interface reference variable pi1 as follows. The value of p2' is copied from the value of p2. The value of p1' is obtained by reading the appropriate entry in the interface-interface cast table corresponding to I2 and adding the value of such entry to p1. The appropriate entry is the entry corresponding to the interface I1, which is identified by an index generated at compile time. In the scenario that I2 does not extend any interface other than I1, the value of p2' may be obtained by copying the value of p2. The code generated by the compiler is stored in persistent memory for subsequent use at execution time.

Next, consider a type 3 dynamic cast from an object reference to an interface reference as illustrated in the following code segment:

```
s1: I pi;
s2: pa = new A;
...
s3: pi = (I) pa;
...
```

Statement s1 declares pi to be an interface reference to an interface I. Statement s2 creates an object OA of type A and assigns to pa a reference to this object. Statement s3 casts the object reference pa to the I reference pi. When processing the statement s3, the compiler preferably generates code for assigning two pointers p1 and p2 to the interface reference variable pi as follows. The pa object may (or may not) implement the interface I. Thus, the s3 statement requires a run-time check to determine if the pa object points to an object that does implement I. This can be done by searching at run time the class-interface cast table for the class corresponding to the object pa to determine if the table includes an entry that corresponds to the interface I. If the search is not successful, a run-time error message is generated. However, if the search is successful, the interface reference pi is assigned pointer values as follows. As described above, pi has two pointer p1 and p2. The first pointer p1 is formed by retrieving the offset stored in the entry in the class-interface cast table for the interface I and adding such offset to the mptr for the pa object. The second pointer p2 is formed by copying pa. The code generated by the compiler is stored in persistent memory for subsequent use at execution time.

Finally, consider a type 4 dynamic cast from a first interface I1 to a second interface I2 which is not extended by the first interface I1 as illustrated in the following code segment:

```
s1: I1 pi1;
s2: pi1 = new (A);
s3: I2 pi2;
...
s4: pi2 = (I2) pi1
...
```

Statement s1 declares pi1 to be an interface reference to an interface I1. Statement s2 creates an object OA of type A and generates an interface reference pi1 having two pointers p1 and p2. The first pointer p1 points to the interface method table for the interface I1 in the class A class descriptor. The second pointer p2 points to the object OA. Statement s3 declares pi2 to be an interface reference to an interface I2. The I2 interface may (or may not) extend the I1 interface. Thus, the s4 statement requires a run-time check to determine if the I2 interface extends the I1 interface. This can be done by searching at run time the class-interface cast table for the class corresponding to the object pointed to by the second pointer p2 of the reference pi1 (in this example, object OA) to determine if the table includes an entry that corresponds to the interface I1. If the search is not successful, a run-time error message is generated. However, if the search is successful, the interface reference pi2 is assigned pointer values as follows. The interface reference pi2 has two pointer p1' and p2'. The first pointer p1' is formed by retrieving the offset stored in the entry in the class-interface cast table for the class corresponding to the object pointed to by the second pointer p2 of the reference pi1 (in this example, object OA) for the interface I2, and adding such offset to the mptr for the pa object. The second pointer p2 is formed by copying p2 of the pi1 interface reference. The code generated by the compiler is stored in persistent memory for subsequent use at execution time.

Method Invocation on Interface References

Figure 7:
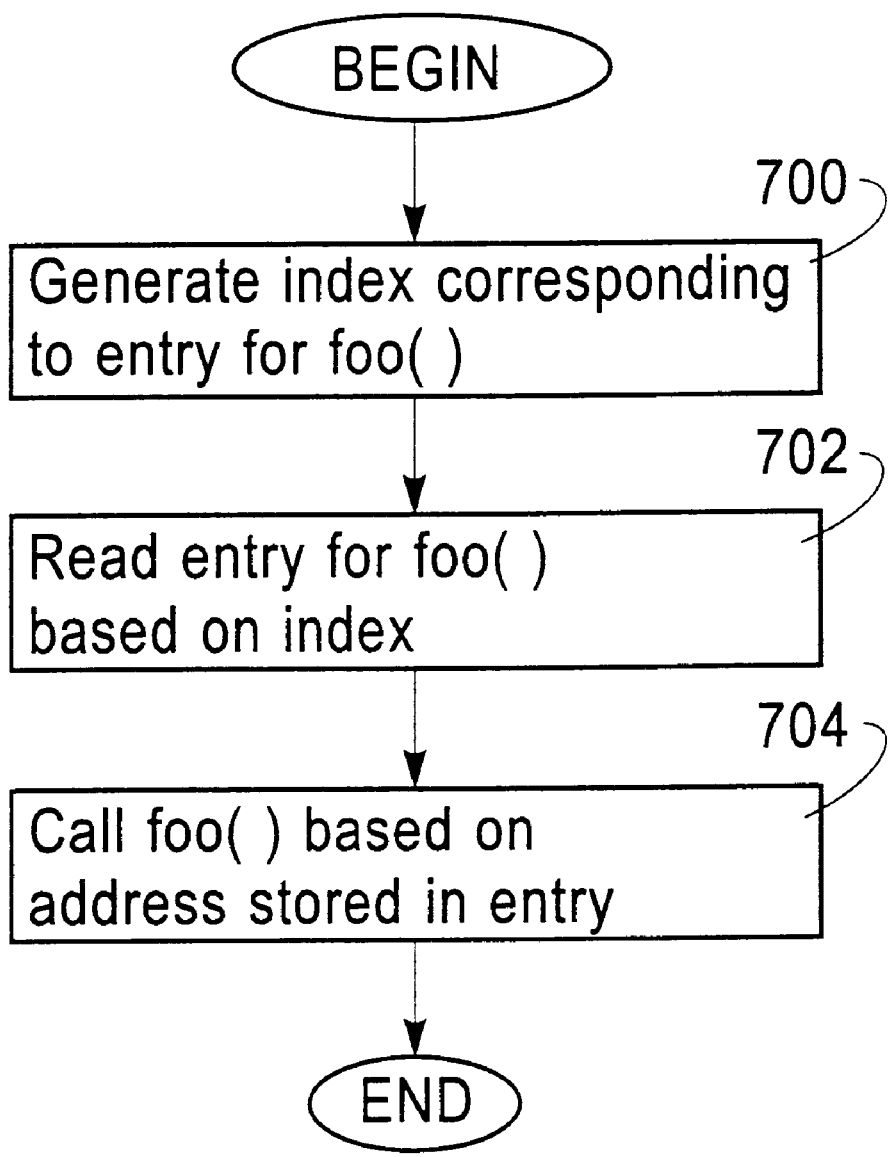
FIG. 7 is a flow chart illustrating operations of method invocation according to the present invention.

Method invocation code is generated by a compiler when processing a method invocation statement. Such code is stored in persistent memory for subsequent use at execution time. Given the above description, method invocations on an interface reference can be implemented efficiently. For example, consider the method invocation pi.foo( ) of the class "Example" as presented above. As shown in FIG. 7, when executing the method invocation pi.foo( ), the following operations are performed.

First, in step 700, an index is generated that identifies the entry corresponding to foo( ) in the interface method table pointed to by the first pointer p1 of the interface reference pi.

The index is preferably generated by adding the offset corresponding to the method foo( ) stored in the interface I Function Table to the value stored by the first pointer p1 of the interface reference pi. The offset is preferably determined at compile time and added to the value of the first pointer p1 at execution time.

Second, in step 702, the data stored by the appropriate entry is read. The location of the data is identified by the index as calculated in step 700. Finally, in step 704, the method foo( ) is called by controlling the computer processing apparatus to jump to the address identified by the data read in step 702. The method call of step 704 may require passing the pointer of the object that implements foo( ) (i.e., the "this" parameter). In this case, the second pointer p2 of the interface reference pi may be copied as the "this" parameter.

As presented above, interface references are represented by a pair of pointers. In an alternate embodiment of the present invention, interface references may be represented by a single object pointer under certain circumstances. Consider a class A that implements an interface I. Assume that the interface method table for I and class method table for A are shared in A's class descriptor such that their starting addresses are the same. This allows the implementation to use a pointer to an A object directly as a reference to an interface I (since the additional interface method table pointer is now unnecessary, as it is the same as the mptr stored in the object). Hence, in such cases, it is not necessary to use a two-pointer implementation for interface references.

In such an implementation, both the one-pointer and two-pointer implementation of interface references need to co-exist. This makes a difference primarily in how the "this" pointer is generated during a method call on an interface reference. In the one-pointer implementation, the interface reference itself is the "this" pointer. In the two-pointer implementation, the second pointer in the interface reference is the "this" pointer. A bit in the interface method table can indicate if the corresponding interface reference variable uses the one-pointer or the two-pointer implementation. For example, for class A above, the interface method table for I can have the bit set to indicate that any interface reference that uses this table is a one-pointer. This bit can be used at method call time to generate the "this" pointer appropriately.

In summary, the present invention provides for interface references that comprise of two pointers. The first pointer is a pointer to one or more entries that identify implementation of methods of the interface. The second pointer is a pointer to an object that implements the methods of the interface. The first pointer is used to invoke the appropriate methods at run time. The second pointer is used primarily to pass as the "this" parameter when invoking methods on the interface reference.

We claim:

1. A computer implemented method for representing interface references in an object oriented language, wherein objects correspond to one or more classes, a class is capable of implementing one or more interfaces, an interface is associated with a set of methods, said object oriented language provides for inheritance of said interfaces whereby a first interface may extend one or more other interfaces, and an interface reference $IR_i$ is associated with an interface ID and with an object OI corresponding to a class that implements the interface ID said computer implemented method comprising the steps of:

(a) for each class $C_i$ of objects, storing in memory descriptor data corresponding to said class $C_i$, wherein said descriptor data includes:

for each interface $ID_i$ implemented by said class $C_j$, an interface method table comprising one or more entries, wherein each entry identifies one of an implementation of a method declared by said interface $ID_i$ and an implementation of a method declared by an interface extended by said interface $ID_i$; and (b) for each interface reference $IR_i$, wherein interface reference $IR_i$ is associated with an interface ID and corresponds to a given object OI, storing in memory a first identifier that identifies an interface method table corresponding to the interface ID within the descriptor data for the class corresponding to the object OI, and storing in memory a second identifier that identifies said object OI.

2. The computer implemented method of claim 1, further comprising the step of:

when a method M is invoked via an interface reference IR to an interface $ID_M$, (i) retrieving from memory said first identifier associated with the interface reference IR, wherein said first identifier identifies said interface method table corresponding to said interface $ID_M$;

(ii) generating an index corresponding to said method M based upon said first identifier retrieved from memory, wherein said index identifies an entry in said interface method table corresponding to said method M;

(iii) retrieving said entry identified by said index;

(iv) invoking said method M using the retrieved entry;

(v) retrieving from memory said second identifier associated with said interface reference IR, wherein said second identifier identifies an object OM corresponding to a class that implements said interface $ID_M$; and (vi) passing said retrieved second identifier to said method M.

3. The computer implemented method of claim 1, wherein, for each class $C_i$ of objects, said descriptor data corresponding to said class $C_i$ stored in memory includes a class method table comprising one or more entries, wherein each entry identifies an implementation of a method inherited or defined by said class $C_i$.

4. The computer implemented method of claim 3, further comprising the step of (c) for each object O, storing in memory a third identifier for identifying a class method table within said descriptor data associated with a class corresponding to said object O.

5. The computer implemented method of claim 1, wherein said descriptor data corresponding to said class $C_i$ is created and stored in memory when said class $C_i$ is declared.

6. The computer implemented method of claim 1, wherein code for generating said first identifier corresponding to said interface reference $IR_i$ is created and stored in memory upon detection of a statement wherein said object OI is assigned to said interface reference $IR_i$ corresponding to said interface declaration ID.

7. The computer implemented method of claim 1, wherein code for generating said first identifier corresponding to said interface reference $IR_i$ is created and stored in memory upon detection of a statement wherein an interface reference $IR_j$ is assigned to said interface reference $IR_i$.

8. The computer implemented method of claim 1, further comprising the step of:

when a method M is invoked via an interface reference IR to an interface $ID_M$, (i) retrieving form memory said first identifier associated with the interface reference IR, wherein said first identifier identifies said interface method table corresponding to said interface $ID_M$;

(ii) generating an index corresponding to said method M based upon said first identifier retrieved from memory, wherein said index identifies an entry in said interface method table corresponding to said method M;

(iii) retrieving said entry identified by said index;

(iv) invoking said method M using the retrieved entry.

9. The computer implemented method of claim 1, further comprising the step of:

for each class $C_i$ of objects, storing in memory a class-interface cast table comprising one or more entries each associated with a given interface I1 implemented by said class $C_i$, wherein each entry identifies offset from a start address of said class method table for said class $C_i$ to an interface table corresponding to said interface I1.

10. The computer implemented method of claim 1, further comprising the step of:

for each class $C_i$ of objects, storing in memory an interface-interface cast table for each interface I1 implemented by said class $C_i$, wherein said interface-interface cast table for said interface I1 comprises one or more entries each associated with an interface I2 extended by said interface I1, wherein each entry identifies offset from a start address of said interface method table for said interface I1 to an interface method table corresponding to said interface I2.

11. The computer implemented method of claim 1, further comprising the step of:

for each interface, storing in memory a function table corresponding to a given interface, wherein said function table stores one or more entries each associated with a given method of said given interface, wherein each entry identifies offset of an entry corresponding to said given method within said interface method table corresponding to said given interface.

* * * * *